United States Patent
Kompfner et al.

[11] 3,823,996
[45] July 16, 1974

[54] MULTICORE, MULTIMODE OPTICAL WAVE TRANSMISSION LINE

[75] Inventors: Rudolf Kompfner, Middletown; Enrique Alfredo Jose Marcatili, Rumson, both of N.J.

[73] Assignee: Bell Telephone Laboratories Incorporated, Murray Hill, N.J.

[22] Filed: Apr. 5, 1973

[21] Appl. No.: 348,158

[52] U.S. Cl. .......................... 350/96 WG, 350/96 B
[51] Int. Cl. ............................................ G02b 5/14
[58] Field of Search .............................. 350/96 WG

[56] References Cited
UNITED STATES PATENTS

| | | | |
|---|---|---|---|
| 3,372,969 | 3/1968 | Snitzer | 350/96 WG |
| 3,493,288 | 2/1970 | Kaufman et al. | 350/96 WG UX |
| 3,600,062 | 8/1971 | Schineller et al. | 350/96 WG X |

Primary Examiner—John K. Corbin
Attorney, Agent, or Firm—S. Sherman

[57] ABSTRACT

This application describes a multimode optical wave transmission line comprising a plurality of single mode fibers. To minimize the delay dispersion, the propagation constants of adjacent pairs of fibers are made to be different.

7 Claims, 5 Drawing Figures

3,823,996
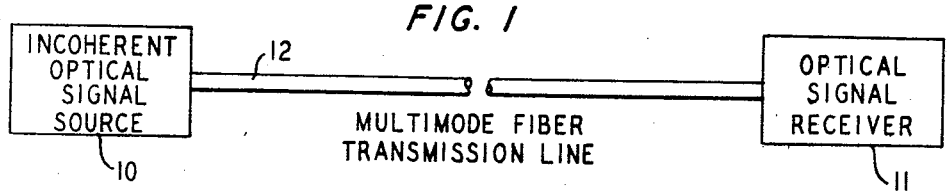
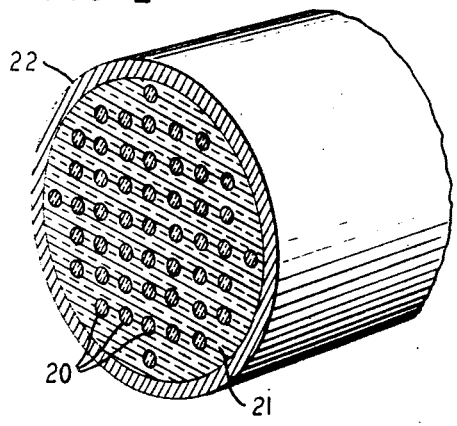
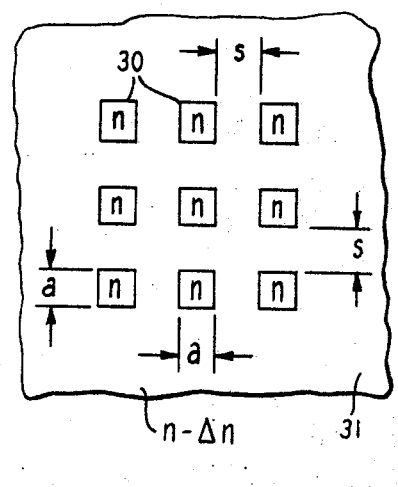
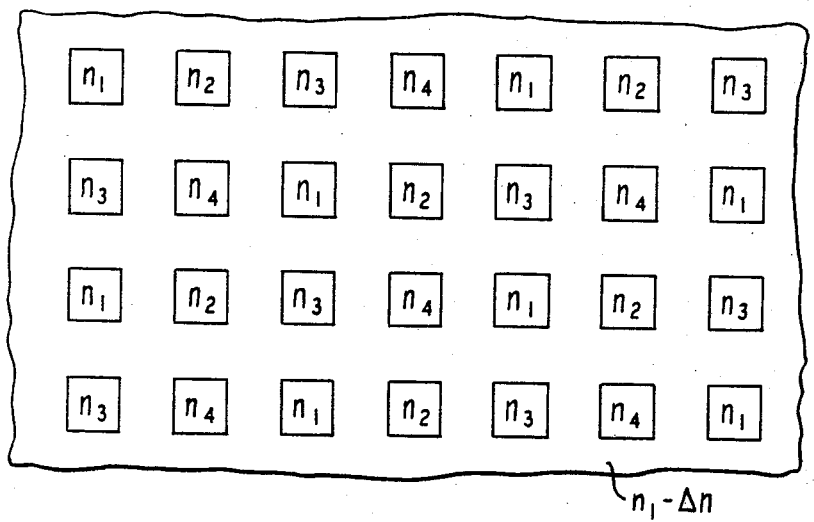
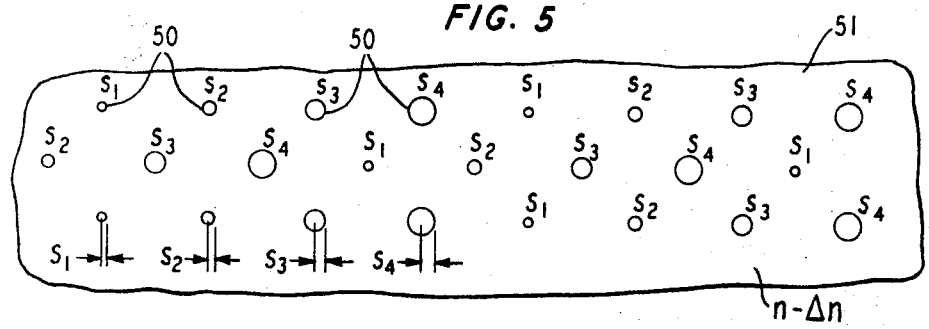

MULTICORE, MULTIMODE OPTICAL WAVE TRANSMISSION LINE

This invention relates to low dispersion, multimode optical fibers.

BACKGROUND OF THE INVENTION

Recent advances in the fabrication of highly transparent materials indicate that fibers made of such materials are a promising transmission medium for optical communication systems. When used in conjunction with incoherent signal sources, such fibers must be multimode since the power coupled from the source into the fiber is proportional to the number of modes that can be guided therealong. However, different modes have different group velocities, and the consequent mode dispersion limits the useful signaling rate.

The broad object of the present invention is to reduce the mode dispersion in a multimode optical fiber.

SUMMARY OF THE INVENTION

A multimode, optical wave transmission line, in accordance with the present invention, comprises a bundle of single-mode fibers. The principle of operation is simple. If the single-mode fibers are widely separated, the coupling among them is very small, and the wave energy propagates along each of the single-mode fibers at a group velocity approaching that of the fundamental fiber mode. Thus, the dispersion of such a multicore fiber approaches that of a single-mode fiber. However, if a bundle of reasonable diameter is to be obtained, the fibers cannot be too widely separated. Accordingly, it is a second feature of the invention that the refractive indices and/or the transverse dimensions of the fiber cores are selected such that the propagation constant of each fiber is different than that of the next adjacent fibers in the bundle. In this way the coupling among the fibers can be kept relatively low even though the fibers are in close physical proximity.

It is, accordingly, an advantage of a multimode, multicore fiber that substantially the same number of modes can be propagated as in a conventional multimode fiber but with much less delay dispersion.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 1 shows, in block diagram, a multimode optical communication system to which the present invention relates;

FIG. 2 shows a multicore, multimode optical fiber comprising a plurality of single-mode optical fibers;

FIG. 3 shows a portion of a multicore optical fiber wherein the individual single-mode fiber cores have the same refractive indices and have square cross sections;

FIG. 4 shows a portion of a multicore optical fiber wherein square fiber cores having four different refractive indices are used; and FIG. 5 shows a portion of a multicore optical fiber wherein circular fiber cores having four different radii are used.

DETAILED DESCRIPTION

Referring to the drawings, FIG. 1 shows, in block diagram, an optical communication system comprising an incoherent optical signal source 10, an optical signal receiver 11, and a multimode transmission line 12 for coupling the source to the receiver.

The present invention relates particularly to the transmission line portion of the system and, specifically, to means for guiding as many modes as possible while still maintaining a low level of mode dispersion. In accordance with the present invention, this objective is realized by the use of the multicore, multimode fiber illustrated in FIG. 2.

The multicore fiber illustrated in FIG. 2 comprises a plurality of $m$ filamentary fiber cores 20 embedded within a common cladding 21 of lower refractive index, where each core and the surrounding cladding constitutes a separate optical fiber. The fiber bundle thus formed is advantageously enclosed within a protective outer jacket 22.

The cross-sectional dimensions of the fiber cores and the refractive indices of the core and cladding materials are selected so that at the operating frequencies of interest, each of the fibers is supportive of but a single mode. For the circular cores illustrated in FIG. 2, the fibers are single mode when $$a < 2.4\lambda/2\pi \sqrt{2n\Delta n} \quad (1)$$

where $a$ is the core radius, of the order of 5 $\mu$m;
$n$ is the refractive index of the core;
$n - \Delta n$ is the refractive index of the cladding;
$\lambda$ is the free space wavelength of the optical signal.

EXAMPLE

To obtain a quantitative measure of the reduction in delay distortion that can be realized by using a multicore, multimode, fiber in preference to the prior art single core, multimode fiber, we assume, for purposes of calculation, that all of the fiber cores 30 of the multicore fiber have the same square cross section, and that the cores are arranged in a checkerboard pattern as illustrated in FIG. 3. For this particular configuration, it can be shown that $$\frac{\tau}{\tau'} \frac{L'}{L} \frac{n'}{n} = \frac{8\pi^2}{(1+V)^2} \frac{s}{a} e^{-\frac{s}{a}V} \left[1-\left(\frac{\pi}{2}\frac{1}{1+V}\right)^2\right]^{1/2} \quad (2)$$

where $\tau$ is the maximum delay in a multicore, multimode fiber;
$\tau'$ is the maximum delay in a single core, multimode fiber;
$L$ is the length of the multicore fiber;
$L'$ is the length of the prior art single core fiber;
$n$ is the refractive index of both the single-mode fiber cores and the prior art multimode fiber core;
$n - \Delta n$ is the refractive index of the single-mode fiber cladding 31;

$n - \Delta n'$ is the refractive index of the prior art single core, multimode fiber cladding;

$a$ is the transverse dimensions of the single-mode fiber cores;

$s$ is the distance between adjacent cores; and $$V = \pi a/\lambda \sqrt{2n \cdot \Delta n}. \quad (3)$$

Since each single-mode fiber can support the lowest order mode in two orthogonal polarizations, the total number of modes N that can be supported in a multicore fiber of diameter D is $$N = \pi/2 \, (D/a + s)^2. \quad (4)$$

The number of modes $N'$ that can be supported by a single core, multimode fiber of diameter $D'$ is $$N' = (\pi D'/\lambda)^2 \, n \cdot \Delta n'. \quad (5)$$

Dividing equation (4) by equation (5), and substituting the value of $n$ from equation (3), we obtain $$(N'/N) \, \Delta n/\Delta n' \, (D/D')^2 = V^2/\pi \, (1 + s/a)^2. \quad (6)$$

Multiplying equations (6) and (2) yields $$\frac{\tau}{\tau'} \frac{N'}{N} \frac{L'}{L} \left(\frac{D}{D'}\right)^2 = \frac{8\pi V^2}{(1+V)^2} \frac{s}{a} \left(1 + \frac{s}{a}\right)^2 e^{-\frac{s}{a}V\left[1 - \left(\frac{\pi}{2}\frac{1}{1+V}\right)^2\right]^{1/2}}. \quad (7)$$

From equation (7) we note that the two multimode fibers are equivalent (i.e., $\tau = \tau'$, $N = N'$, $L = L'$, $D = D'$) when $s/a = 1.05$. For $s/a > 1.05$, the multicore fiber is better than the prior art single core fiber in the sense that it has a smaller delay distortion ($\tau < \tau'$), or, for the same maximum delay distortion, can support a larger number of modes ($N > N'$), or can have a longer length ($L > L'$), or can have a smaller diameter ($D < D'$).

As a specific example, in the case where $D = D'$, $N = N'$ and $s/a = 2$, we obtain from equation (7) that $(\tau/\tau' \cdot L'/L = 0.1$. This states that for equal lengths of fiber, ($L = L'$), the mode dispersion in a multicore, multimode fiber is only one-tenth the mode dispersion in a single core, multimode fiber. Conversely, for equal mode dispersion, ($\tau = \tau'$), a multicore fiber can be ten times longer than the ordinary multimode fiber. This improvement, however, requires a 12 fold increase in the difference in the refractive indices of the core and cladding. That is, $\Delta n = 12 \, \Delta n'$. Typically $\Delta n'/n$ is of the order of 0.3 percent, so that $\Delta n/n$ in the multicore fiber should be about 3.6 percent.

In the discussion hereinabove, it was assumed that all of the single mode fibers were the same, i.e., had the same propagation constant. A significant improvement can be realized, however, if adjacent fibers have different propagation constants. This is deduced from equation (2) which states that the maximum delay $\tau$ is reduced as the distance $s$ between fiber cores is increased. However, if this distance is increased, either the number of fibers included within a fiber bundle of fixed diameter must be reduced or, for the same number of fibers, the overall diameter of the fiber bundle must be increased. Since neither of these alternatives is desirable, in a preferred embodiment of the invention the equivalent of increasing the core-to-core spacing is achieved by decoupling the cores from each other by making the propagation constant of each of the single-mode fibers differ from that of each of the next adjacent fibers. Such an arrangement is illustrated in FIG. 4, which shows the same array of fibers as in FIG. 3 except that in this embodiment cores having four different refractive indices $n_1$, $n_2$, and $n_4$ are used, where $n_1 < n_2 < n_3 < n_4$. If, for purposes of illustration, the core indices for each row are arranged in regular order, $n_1$, $n_2$, $n_3$, $n_4$, $n_1$, $n_2$..., as shown in FIG. 4, one way of obtaining the desired decoupling of adjacent fibers is readily realized by displacing the distribution of indices of alternate rows of cores by two cores. Thus, whereas the order of indices on the upper most row is $n_1$, $n_2$, $n_3$, $n_4$, $n_1$, $n_2$, $n_3$, et cetera; the order in the next adjacent row is $n_3$, $n_4$, $n_1$, $n_2$, $n_3$, $n_4$, $n_1$, et cetera. As can be seen, no two adjacent cores have the same refractive indices.

FIG. 5 shows an alternate embodiment of the invention using round fiber cores 50 arranged in a honeycomb pattern in cladding 51. In this particular embodiment, adjacent fibers are decoupled by using fiber cores having four different radii $s_1$, $s_2$, $s_3$ and $s_4$ where $s_1 < s_2 < s_3 < s_4$. To insure that pairs of adjacent cores have different propagation constants, adjacent rows of cores are displaced two core radii with respect to each other. In this embodiment all the cores can have the same refractive indices or cores having four different refractive indices can be used such that cores of different radii also have different refractive indices.

While large differences in refractive indices and/or radii would be preferred for purposes of decoupling adjacent fibers, in all cases the relationship between the refractive index and the radius of each fiber must be maintained within the limits defined by equation (1) to insure single mode operation. A minimum refractive index difference of the order of 0.5 percent, or a minimum radius difference of about 10 percent for adjacent fiber cores is typical.

SUMMARY

A multicore, multimode fiber, comprising a bundle of single-mode fibers is shown to have less mode dispersion than a comparable single core, multimode fiber of equal diameter. It is also shown that this improvement can be further enhanced by making the propagation constants of adjacent single-mode fibers different.

While square fiber cores, arranged in a checkerboard manner, were used in order to simplify the calculations, comparable qualitative results would be obtained using round fiber cores similarly arranged, or using either round or square fiber cores arranged in a honeycomb pattern. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

We claim

1. A multimode optical wave transmission line comprising:
   a plurality of single-mode optical fibers disposed within a common enclosure;
   characterized in that the propagation constant of each fiber is different than that of the next adjacent fibers throughout said enclosure.

2. The transmission line according to claim 1 wherein said single-mode fibers comprise a plurality of fiber cores disposed within a common cladding of lower refractive index.

3. The transmission line according to claim 2 wherein the refractive indices of adjacent fiber cores are different.

4. The transmission line according to claim 2 wherein the refractive indices of adjacent fiber cores differ by at least 0.5 percent.

5. The transmission line according to claim 2 wherein the radii of adjacent fiber cores are different.

6. The transmission line according to claim 2 wherein the radii of adjacent fiber cores differ by at least 10 percent.

7. An optical wave transmission system comprising:
   a multimode optical signal source;
   an optical signal receiver;
   and a multimode optical transmission line for coupling said source to said receiver comprising:
   a plurality of transversely spaced filamentary fiber cores embedded in a common cladding material of lower refractive index;
   the refractive indices and the cross-sectional dimensions of said cores being selected to form a bundle of single-mode fibers wherein the propagation constant of each fiber is different than that of the next adjacent fibers throughout said bundle.

* * * * *